Patented Oct. 14, 1952

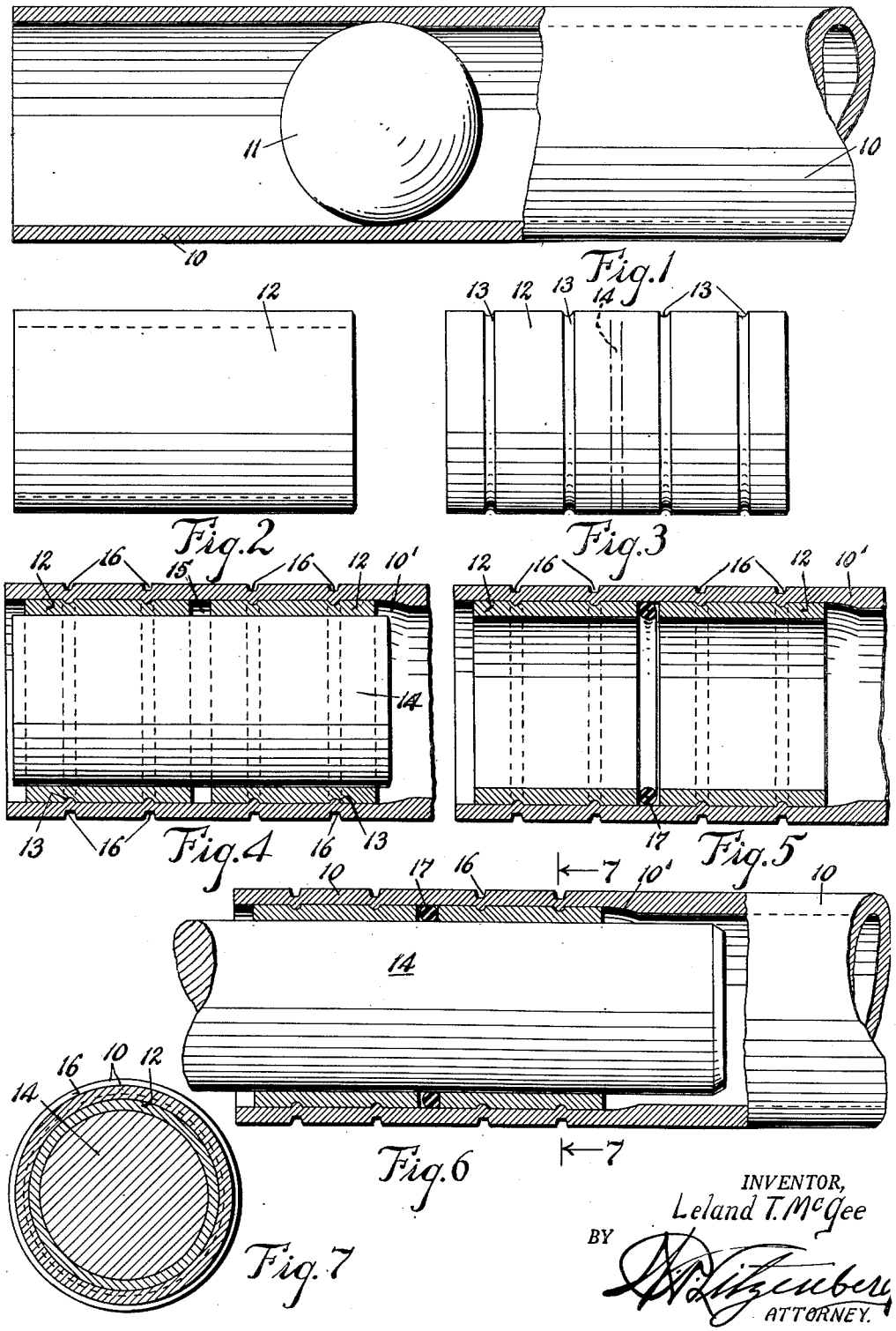

2,613,431

UNITED STATES PATENT OFFICE 2,613,431

METHOD OF MAKING HYDRAULIC CYLINDERS WITH PLUNGERS

Leland T. McGee, Los Angeles, Calif.

Application March 22, 1948, Serial No. 16,334

1 Claim. (Cl. 29—156.4)

This invention relates to method of making hydraulic power cylinders, and more particularly to that type of power cylinders which are used in heavy dirt handling machines where scrapers, bulldozers, and earth moving machines are raised and lowered, or otherwise moved by hydraulic power, usually by the forward or thrust movement of a piston or plunger controlled from the operator's seat.

In power cylinders of this character, there is usually a good deal of machine work required to get accuracy and to prevent leakage, which naturally increases the cost of manufacture.

I have conceived and worked out a simple and practical method of manufacturing such cylinders with their plungers therein at a greatly reduced cost of manufacture, and by means of which I am able to do away with the machine work in order to avoid leakage and inefficiency in practical operation.

In order to explain my invention, I have illustrated the same on the accompanying sheet of drawings which I will now describe.

Figure 1 is a side elevation of a piece of steel tubing, with a portion broken out and in section;

Figure 2 is a side elevation of a brass bushing;

Figure 3 is a side elevation of the same bushing showing steps in the method of preparing it for use;

Figure 4 is a longitudinal sectional view through a steel tube with two bushings therein and with a steel plunger therein;

Figure 5 is a similar view of the case, bushings and gasket ready for the plunger;

Figure 6 is a sectional view showing case or tube, bushings, gasket and plunger in place for actual operation; and Figure 7 is a cross sectional view taken on line 7—7 of Fig. 6.

Instead of using a steel cylinder, bored and machined to give accuracy in size and smoothness, I take a section of steel tubing, designated 10, and force a steel ball 11, which is slightly larger, say one ten thousandths larger, and force this through the tube to a predetermined place, and then force it back again. This enlarges the steel tube to the desired size, depending on the size of the bushings which are to be used therein, and accomplishes it in an economical and effective manner.

I then take a brass bushing, such as I desire to use in said steel tube, and put it in a lathe and groove it, as shown in Fig. 3, said bushing being designated 12, and the grooves 13. Said bushing is then cut in two, on the broken lines 14', Fig. 3, to produce two bushings 12, 12, as seen in Figs. 4 and 5.

I next insert said bushings into the steel tube 10, with a steel plunger 14 inserted into said bushings, as seen in Fig. 4. This is to give solidity and bearing inside the tube and bushings for the next step in my method. The bushings, of course, are driven in and positioned so as to leave a space between them, designated 15, Fig. 4. The bushings are reamed to the size of the steel rod or plunger to operate therein.

The next step is to groove the steel cylinder, at the positions of the grooves in the bushings. I accomplish this by using a pipe cutting tool, with dull element, and by operating it around the tube, I provide the grooves 16, 16 in said steel tube, which are also pressed inwardly into the corresponding grooves in the bushings, as clearly seen in Figs. 4 and 5, thus locking said bushings in the steel tube, with the space 15 therebetween.

The steel rod or plunger 14 is then withdrawn, and a ring gasket 17 is inserted into the bushings, in the space 15, as seen in Fig. 5. This is easily accomplished by hand, whereupon the plunger 14 is then inserted, and everything is ready for operation and produces a perfect seal for the plunger. The enlargement of the inside of the steel tube 10, is exaggerated somewhat for explanation purposes, and this enlargement is shown ended, as at 10', Figs. 4, 5 and 6.

Thus with this original method, as above described, I have produced a most efficient cylinder and plunger structure at low cost, and which is most efficient, and I do not limit my invention to the details here described, except as I may be limited by the hereto appended claim.

I claim:

The method of making a hydraulic cylinder with plunger, which consists in taking a steel tube for the cylinder, forcing a pair of circumferentially grooved bushings thereinto, but leaving a space between their inner ends, inserting a steel plunger through said bushings to give solidity, indenting said steel tube from the outside to interlock with the grooves in said bushings to hold the latter in place, withdrawing said steel plunger bar and inserting a ring gasket in the gasket space between the inner ends of said bushings, and inserting a plunger through said bushings and said ring gasket, said gasket sealing around the plunger and around the inner surface of said steel tube, in the manner indicated.

LELAND T. McGEE.

(References on following page)

REFERENCES CITED

The following references are of record in the file of this patent:

UNITED STATES PATENTS

| Number | Name | Date |
|---|---|---|
| 168,640 | Hartley | Oct. 11, 1875 |
| 1,004,151 | Daniels et al. | Sept. 26, 1911 |
| 1,291,388 | Bright | Jan. 14, 1919 |
| 1,322,250 | Lewis | Nov. 18, 1919 |
| 1,699,688 | Cross | Jan. 22, 1929 |
| 1,722,389 | Opie | July 30, 1929 |
| 1,836,798 | Hefti | Dec. 15, 1931 |
| 1,998,047 | Farr | Apr. 16, 1935 |
| 2,001,204 | Long | May 14, 1935 |
| 2,018,392 | Willink | Oct. 22, 1935 |
| 2,155,180 | Caldwell | Apr. 18, 1939 |

FOREIGN PATENTS

| Number | Country | Date |
|---|---|---|
| 259,891 | Great Britain | Oct. 21, 1926 |